(12) United States Patent
Hunt

(10) Patent No.: US 8,415,608 B2
(45) Date of Patent: Apr. 9, 2013

(54) FREQUENCY SELECTIVE COMMUNICATIONS SYSTEM

(75) Inventor: Jeffrey H. Hunt, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 244 days.

(21) Appl. No.: 13/024,850

(22) Filed: Feb. 10, 2011

(65) Prior Publication Data

US 2012/0207484 A1 Aug. 16, 2012

(51) Int. Cl.
*H04B 10/06* (2006.01)

(52) U.S. Cl.
USPC ...................................... 250/214.1

(58) Field of Classification Search ............... 250/214.1, 250/214 R; 398/68–72; 359/333–334
See application file for complete search history.

(56) References Cited

U.S. PATENT DOCUMENTS

| | | | |
|---|---|---|---|
| 6,891,660 B2 | 5/2005 | Hunt et al. | |
| 6,924,925 B2 | 8/2005 | Hunt et al. | |
| 2006/0115086 A1* | 6/2006 | Beausoleil et al. | 380/263 |
| 2006/0210083 A1* | 9/2006 | Takemoto et al. | 380/278 |
| 2006/0222180 A1* | 10/2006 | Elliott | 380/263 |

OTHER PUBLICATIONS

C.A. Huber et al., Nanowire Array Composites, Science 263, pp. 800-802 (1994).
T.E. Huber et al., Confinement Effects and Surface Charge in Bi Nanowires, Appl. Phys. Lett. 84, pp. 1326-1328 (2004).
P. Jones et al., Electrical contact resistance of individual bismuth telluride nanowires, Proc. 25th Int. Conf. Thermoelectrics held 2006 (IEEE, Piscattaway, 2007). pp. 693-696.
Optoelectronics and Nanophotonics NASA article [See http://www.nasa.gov/centers/ames/research/technology-onepagers/optoelectronics.html].

* cited by examiner

*Primary Examiner* — Seung C Sohn
(74) *Attorney, Agent, or Firm* — Vista IP Law Group LLP; Cynthia A. Dixon

(57) ABSTRACT

A system and method are disclosed for a frequency selective communications system for sensing a sequence of multi-wavelength photons. The frequency selective communications system includes at least one intensity control device, at least one polarization control device, at least one focusing element, at least one frequency selective electromagnetic detector, and at least one processor. The frequency selective electromagnetic detector detects the sequence of photons. When the frequency selective electromagnetic detector senses a photon, the frequency selective electromagnetic detector emits an electrical pulse that has a voltage that is proportional to the energy level of the sensed photon. The processor processes the emitted electrical pulses, and de-multiplexes the sequence of emitted electrical pulses based on the voltage of the electrical pulses. In one or more embodiments, the frequency selective communications system is a frequency selective optical communications system that is used to sense photons having optical frequencies.

20 Claims, 4 Drawing Sheets

FREQUENCY SELECTIVE COMMUNICATIONS SYSTEM

BACKGROUND

The present disclosure relates to communications systems. In particular, it relates to frequency selective communications systems.

SUMMARY

The present disclosure relates to a system, method, and apparatus for a frequency selective communications system for sensing a sequence of multi-wavelength photons. In one or more embodiments, the disclosed frequency selective communications system includes at least one intensity control device, at least one polarization control device, at least one focusing element, at least one frequency selective electromagnetic detector, and at least one processor. At least one intensity control device is used to select a range of the rate of arrival of the photons that are to be sensed. In addition, at least one polarization control device is utilized to select the polarization of the photons that are to be sensed. Also, at least one focusing element is used to focus the photons that are being sensed.

Additionally, at least one frequency selective electromagnetic detector is employed to detect the sequence of the photons that are focused from at least one focusing element. When at least one frequency selective electromagnetic detector senses at least one photon, the frequency selective electromagnetic detector(s) emits an electrical pulse(s) that has a voltage that is proportional to the energy level of the sensed photon(s). Also, at least one processor is used for processing at least one electrical pulse, and for de-multiplexing the sequence of electrical pulses based on the voltages of the electrical pulses.

The frequency selective communications system is a frequency selective optical communications system that is used to sense photons having optical frequencies. In at least one embodiment, at least one intensity control device is an electromagnetic energy filtering device. In some embodiments, at least one polarization control device is a polarizer. In one or more embodiments, the polarizer selects horizontal polarization, vertical polarization, left-hand circular polarization, and/or right-hand circular polarization.

At least one focusing element is a signal collection lens. In some embodiments, at least one frequency selective electromagnetic detector includes a nanowire array constructed from a plurality of nanowires of different compositions. A nanowire has a diameter in a size range associated with nanoparticles, which are 1-100 nanometers (nm) in size. The length of a nanowire is longer than the diameter of the nanowire, and the length of a nanowire can be in a size range from millimeters (mm) to centimeters (cm). In the nanowire array, at least one nanoparticle-sized diameter thermoelectric junction is formed between the nanowires of different compositions. In some embodiments, at least one of the nanowires in the nanowire array is manufactured from a compound material including Bismuth (Bi) and Tellurium (Te).

The present disclosure also teaches a method consisting of a frequency selective communications system for sensing a sequence of multi-wavelength photons involves propagating a sequence of the photons into the input of at least one intensity control device. The method further involves selecting, with at least one intensity control device, a range of the rate of arrival of the photons that are to be sensed. In addition, the method involves propagating the sequence of the photons from the output of at least one intensity control device into the input of at least one polarization control device. Also, the method involves selecting, with at least one polarization control device, the polarization of the photons that are to be sensed.

Additionally, the method involves propagating the sequence of the photons from the output of at least one polarization control device onto the collection surface of at least one focusing element. The method further involves focusing, with at least one focusing element, the photons that are collected onto at least one frequency selective electromagnetic detector. Also, the method further involves detecting, with at least one frequency selective electromagnetic detector, the sequence of the photons that were focused by at least one focusing element. In addition, the method involves emitting, from the output of at least one frequency selective electromagnetic detector, a sequence of electrical pulses, whereby the electrical pulses have a voltage that is proportional to the energy level of its respective detected photon. Further, the method involves processing, with at least one processor, the sequence of the electrical pulses. Additionally, the method involves de-multiplexing, with at least one processor, the sequence of the electrical pulses based on the voltages of the electrical pulses.

Additionally, the present disclosure teaches a communications device for sensing a sequence of photons. The communications device includes at least one intensity control device, at least one polarization control device, at least one focusing element, at least one frequency selective electromagnetic detector, and at least one processor. At least one intensity control device selects a range of a rate of arrival of the photons that are to be sensed, and at least one polarization control device selects a polarization of the photons that are to be sensed. Also, at least one focusing element focuses the photons that are being sensed. Additionally, at least one frequency selective electromagnetic detector detects the sequence of the photons that are focused from at least one focusing element. When at least one frequency selective electromagnetic detector senses at least one photon, the frequency selective electromagnetic detector(s) emits an electrical pulse(s) that has a voltage that is proportional to an energy level of the sensed photon(s). In addition, At least one processor processes the electrical pulses, and de-multiplexes the sequence the electrical pulses based on the electrical pulses' voltage.

The present disclosure also teaches a computer-readable medium comprising instructions that when executed are used to process, with at least one processor, a sequence of electrical pulses. The method involves providing the sequence of the electrical pulses to at least one processor. The method further involves processing, with the at least one processor, the sequence of the electrical pulses. At least one processor uses voltages of the electrical pulses to calculate frequencies and/or wavelengths of the photons that are associated with the electrical pulses. Further, the method involves de-multiplexing, with at least one processor, the sequence of the electrical pulses.

DRAWINGS

These and other features, aspects, and advantages of the present disclosure will become better understood with regard to the following description, appended claims, and accompanying drawings where:

Figure 3:
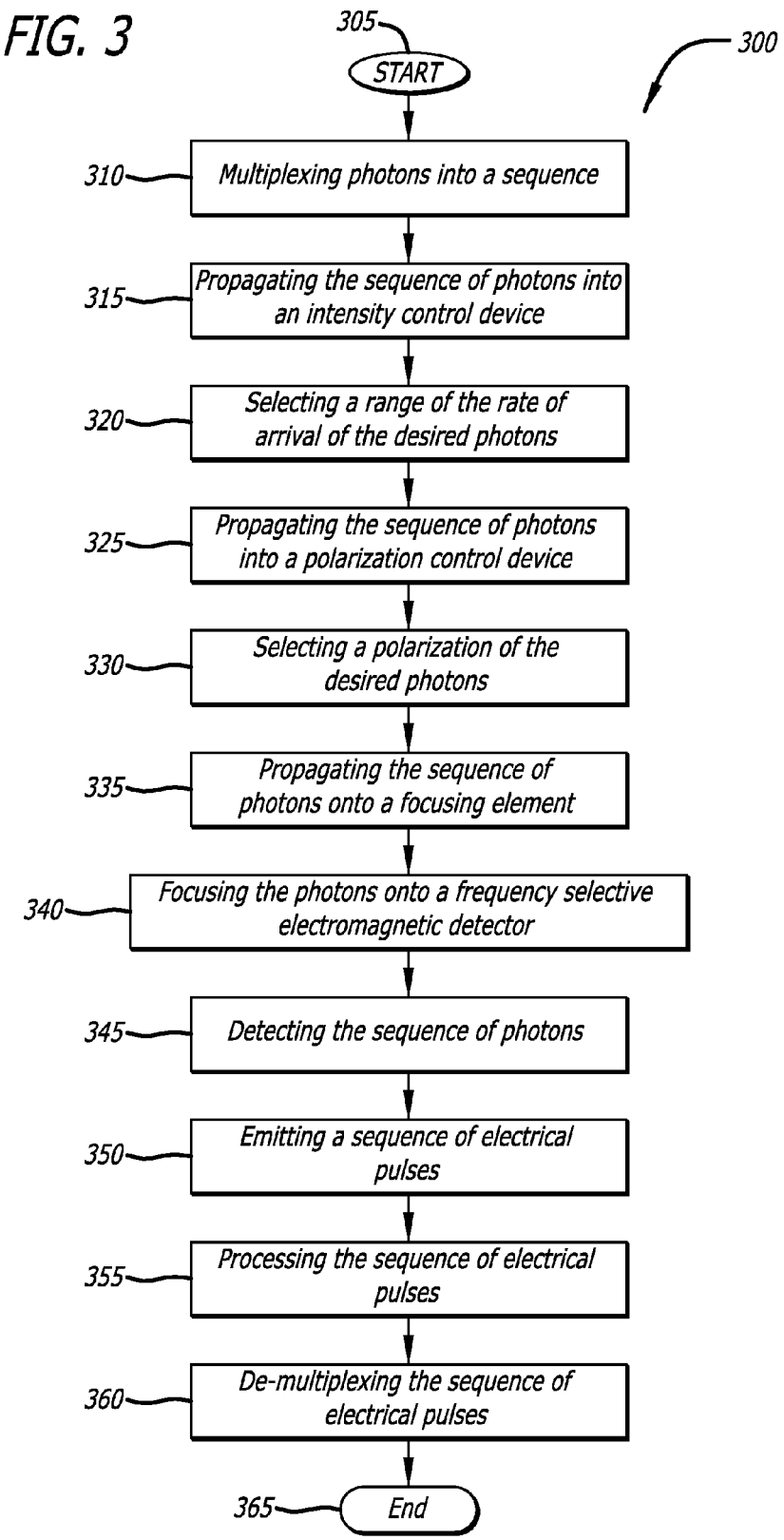

FIG. 3 displays a flow chart of the disclosed method for using the disclosed frequency selective communications system for sensing a sequence of multi-wavelength photons.

Figure 4:
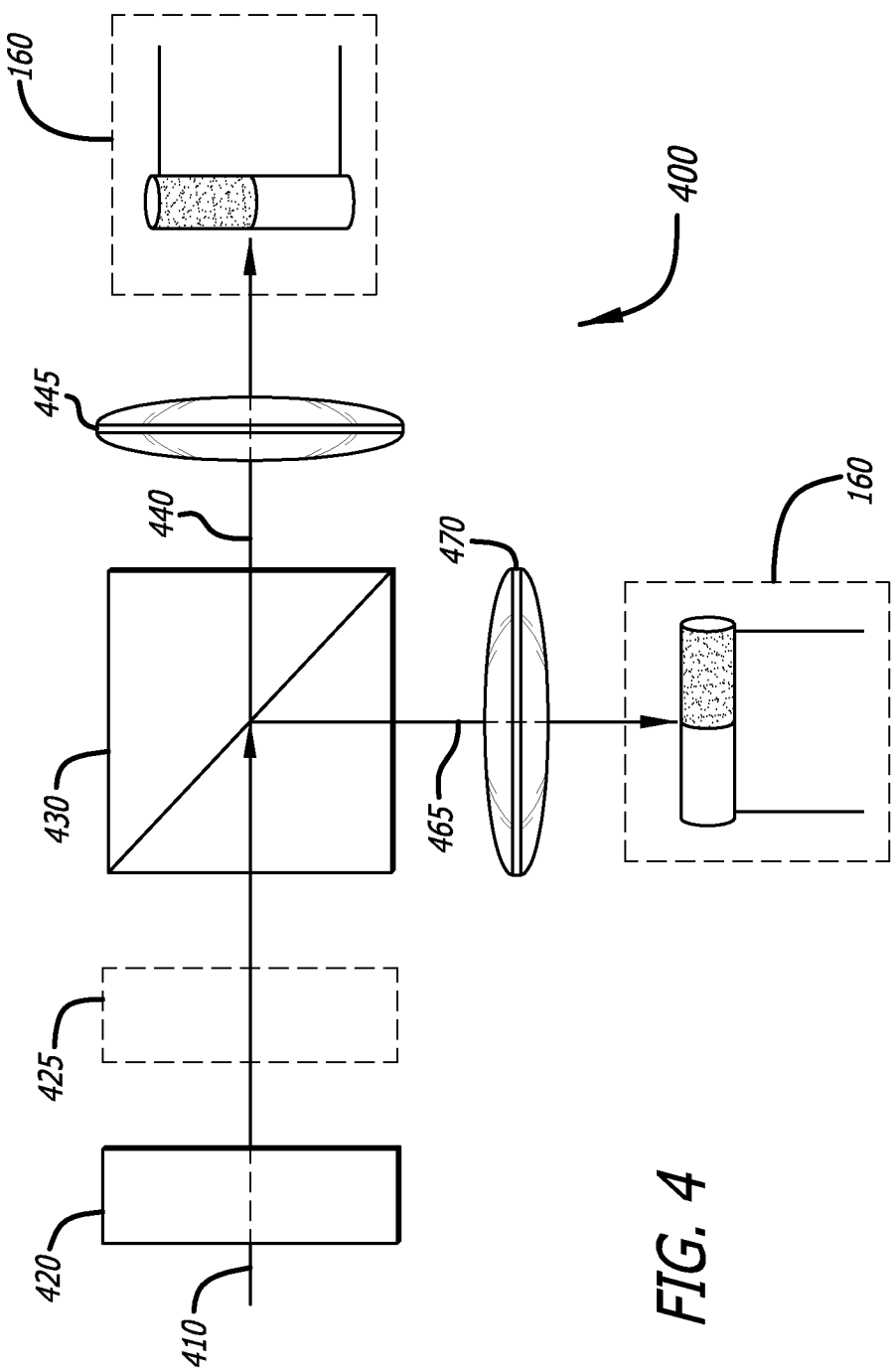

FIG. 4 illustrates a simplified block diagram of a frequency selective communications system that employs a polarization beam splitter in order to achieve additional bandwidth.

DESCRIPTION

The methods and apparatus disclosed herein provide an operative system for a frequency selective communications system. In particular, the present disclosure uses nanowires to build a frequency selective electromagnetic detector to be employed by the disclosed frequency selective communications system. For the frequency selective electromagnetic detector, the nanowires are constructed in a nanowire array. The nanowire array allows for the detector to be able to convert the detected electromagnetic signals into electrical signals, while maintaining the wavelength (i.e. frequency) information associated with the detected electromagnetic signals.

The disclosed frequency selective electromagnetic detector is preferably a frequency selective optical detector for sensing photons having optical frequencies. However, in alternative embodiments, the disclosed frequency selective electromagnetic detector may be manufactured to detect frequencies of electromagnetic radiation other than optical frequencies. In addition, the nanowires are preferably manufactured from a compound material containing Bismuth (Bi) and Tellurium (Te) (e.g., Bismuth Telluride ($Bi_2Te_3$)). However, in other embodiments of the present disclosure, the nanowires may be manufactured from other materials that exhibit thermoelectric properties that are similar to the thermoelectric properties of Bismuth Telluride.

In order to better understand the features of the disclosed frequency selective electromagnetic detector, a brief discussion regarding conventional optical communications sensors is presented. Conventional optical communications sensors typically operate as bulk frequency absorption devices. In fact, most conventional optical detectors employ bulk semiconductors (e.g., avalanche photodiodes (APD)), which absorb electromagnetic radiation across large frequency ranges and have no means to discriminate against electromagnetic radiation in specific frequency ranges. In order to achieve increased bandwidth, these optical communications systems operate using multiple narrow frequency bands, which have wavelengths that are approximately 1.5 microns in length. These optical communications systems present a technical challenge because they require a mechanism to separate out the many optical frequencies that are operational.

In order to make the conventional optical communication sensors be wavelength selective, optical elements (e.g., filters, diffraction gratings, etc.) must be placed in the optical path in front of the optical sensor to only allow the electromagnetic radiation of interest to reach the sensor. The inclusion of these optical elements introduces a disadvantage to these optical communications systems because they add additional size, weight, and complexity to the optical communications systems. In addition, it should be noted that some conventional optical sensors require their optical elements to be in strict alignment with the optical path in order to make them operational. As such, considerable effort is required to simply make these optical communications systems operational.

Optical communications signal detection that can detect both low light levels while maintaining wavelength sensitivity is very challenging to achieve. Currently, most communications detection is performed using avalanche photodiodes. An avalanche photodiode is a device that has a gain on the order of several orders of magnitude. An avalanche photodiode detector collects a small amount of light, and converts it to a proportional electrical signal. A separate processing system is then needed to reassemble the signal.

The system of the present disclosure uses nanoparticle-sized diameter thermoelectric junctions to be able to achieve quantum sensing that is wavelength sensitive. When a thermoelectric element is exposed to light, the electromagnetic field is dissipated in the element, and the energy that is deposited generates electrical power that can be used for sensing the light. This type of thermoelectric element is generally referred to as a bolometer. Generally, a bolometer is a device for measuring the energy of incident electromagnetic radiation.

It is possible to fabricate nanoparticle-sized bolometers from nanoparticle-sized diameter junctions between nanowires of different compositions. These nanoparticle-sized diameter junctions respond to individual photons by emitting an individual electrical pulse having a voltage that is proportional to the temperature change caused by the absorption of the photon. The temperature change is proportional to the energy of the photon. Thus, these nanoparticle-sized diameter junctions are sensitive to wavelength. It should be noted that recently, it has been demonstrated that as the wire diameter of a nanoware is reduced, thermal transport in the nanowire is drastically decreased because of less phonon scattering within the nanowire walls.

Currently, the detectors that operate in the single photon regime are limited to photomultipliers and avalanche photodiodes. Neither of these types of devices has wavelength selectivity. Photomultipliers are constructed from tubes that are very delicate and, thus, they can easily be damaged. Avalanche photodiodes must operate in Geiger mode for them to achieve single photon detection. As such, avalanche photodiodes are extremely noisy, and have long dead times after they detect a photon. The frequency selective electromagnetic detector of the present disclosure will not only solve the problems associated with each of these two types of detectors, but will also allow for wavelength selectivity.

It should be noted that since the disclosed frequency selective communications system is wavelength sensitive, the disclosed system does not have the requirement for frequency separation prior to detection. The disclosed system is able to detect all of the communications signals on a single detector, and sort out the signal frequencies after the detection has been performed. In other words, instead of separating out the optical signal carrier frequencies before the communication signals enter the detector, the signal sorting can be accomplished after detection, when the electronic signals can be more rapidly processed. This feature allows for a significant reduction in both the complexity of the system hardware and the number of detectors required for the communications processing.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 1:
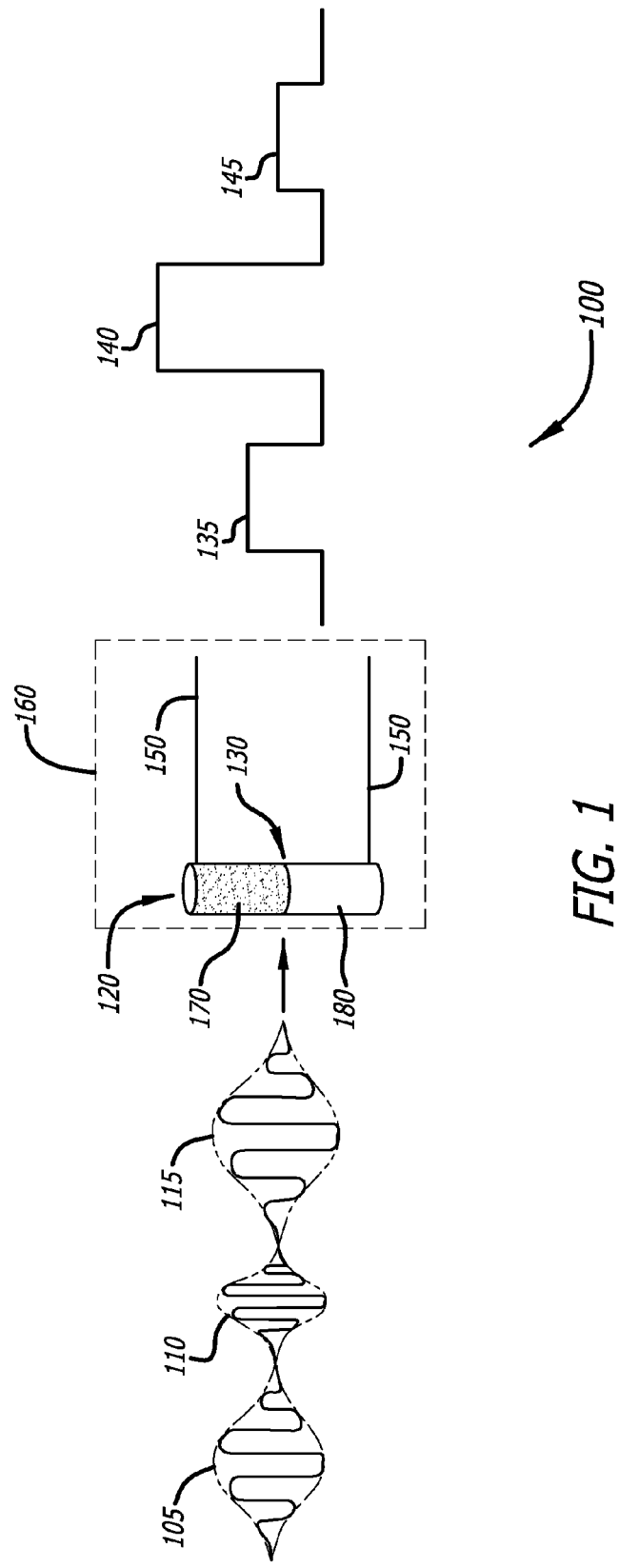
FIG. 1 illustrates a simplified block diagram of the disclosed frequency selective electromagnetic detector during operation.

FIG. 1 illustrates a simplified block diagram of the disclosed frequency selective electromagnetic detector during operation 100, in accordance with at least one embodiment of the present disclosure. In this figure, a sequence of three multi-wavelength photons 105, 110, 115 are shown to be propagated towards a frequency selective electromagnetic detector 160. Each photon has a frequency (e.g., photon 105 has frequency v1, photon 110 has frequency v2, and photon 115 has frequency v3), which is proportional to its respective level of energy (e.g, photon 105 has energy level E1, photon 110 has energy level E2, and photon 115 has energy level E3). Energy (E) is equal to hv, where h is equal to the Planck constant and v is equal to frequency. It should be noted that for a given frequency (v), its corresponding wavelength (λ) is equal to c/v, where c is equal to the speed of light.

Also in this figure, the frequency selective electromagnetic detector 160 is shown to include a composite nanowire 120, which is fabricated from two different materials 170, 180. Two electrical terminals 150 are shown to be connected to each end of the nanowire 120. The nanowire 120 has a nanoparticle-sized diameter thermoelectric junction 130 that is formed between the two different materials 170, 180. During operation of the disclosed frequency selective electromagnetic detector 160, when the nanoparticle-sized diameter thermoelectric junction 130 senses a sequence of photons 105, 110, 115, the nanoparticle-sized diameter thermoelectric junction 130 emits a sequence of electrical pulses 135, 140, 145 via the electrical terminals 150. The voltage of the emitted electrical pulses 135, 140, 145 is proportional to its respective sensed photon's 105, 110, 115 level of energy and, thus, the magnitude of the emitted electrical pulses 135, 140, 145 can be used to determine its respective photon's 105, 110, 115 associated frequency.

With regard to the nanoparticle-sized diameter thermoelectric junction 130, the thermoelectric effect is the effect in the nanoparticle-sized diameter thermoelectric junction 130 where a temperature difference causes a voltage to be generated. Typically, values are measured in microvolts (µV) per Kelvin (K). When a temperature difference is applied to the nanoparticle-sized diameter thermoelectric junction 130, the charged carriers in the nanowire 120, whether they are electrons or holes, diffuse from the nanoparticle-sized diameter thermoelectric junction 130 to the connecting electrical terminals 150. In this way, the behavior is similar to the way that a classical gas expands when heated. As a result, the mobile charged carriers migrating to the electrical terminals 150 leave behind their oppositely charged and immobile nuclei at the nanoparticle-sized diameter thermoelectric junction 130, thus giving rise to a thermoelectric voltage. As such, the nanoparticle-sized diameter thermoelectric junction 130 is in essence operating as a thermoelectric semiconductor.

As previously mentioned, the frequency selective electromagnetic detector 160 is preferably manufactured from a compound material containing Bismuth (Bi) and Tellurium (Te), such as Bismuth Telluride ($Bi_2Te_3$). However, the frequency selective electromagnetic detector 160 may be manufactured from other materials that exhibit thermoelectric properties that are similar to the thermoelectric properties of Bismuth Telluride. In general, the materials to be used are selected according to the operational frequency range of the frequency selective electromagnetic detector 160. In addition, it should be noted that the diameter of the nanoparticle-sized diameter thermoelectric junction 130 will also generally be selected according to the desired operational frequency range.

It should be noted that the operational frequency detection regime of any material operating as a conventional semiconductor is limited to shorter wavelengths because photons having longer wavelengths do not have enough energy to excite the electrons across the material band gap. When wavelengths have photon energy that is below that of the material band gap, the semiconductor material will not respond. Operating as a thermoelectric semiconductor, Bismuth Telluride (BiTe) has a very small band gap. Depending upon the exact composition of the BiTe material, the band gap will be approximately 30-50 milli electron volts (meV). Thus, the implication is that the disclosed frequency selective electromagnetic detector 160, when manufactured from BiTe, will operate as a frequency selective optical detector from the soft ultraviolet (UV) spectrum (~300 nanometers (nm)) throughout the visible light spectrum (~400 to 770 nm) well into the infrared spectrum (~770 nm to 20 microns).

Figure 2:
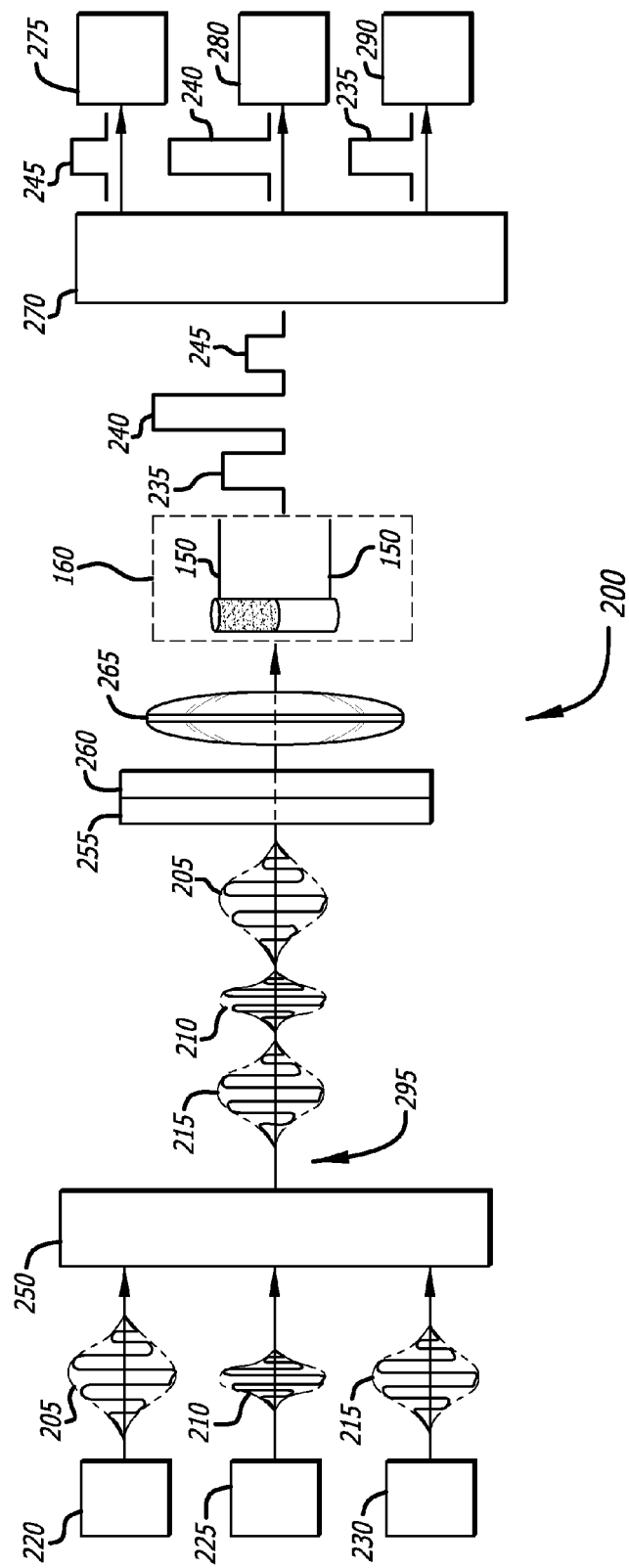
FIG. 2 shows a simplified block diagram of the disclosed frequency selective communications system for sensing a sequence of multi-wavelength photons.

FIG. 2 shows a simplified block diagram of the disclosed frequency selective communications system for sensing a sequence of multi-wavelength photons 200, in accordance with at least one embodiment of the present disclosure. In particular, this figure illustrates how the disclosed frequency selective communications system provides multi-spectral communication between independent senders 220, 225, 230 and receivers 275, 280, 290. In order to understand the operation of the disclosed system 200, the path of a sequence of photons 205, 210, 215 travelling through the system 200 is described.

In this figure, three independent senders 220, 225, 230 are shown to output encoded data photons 205, 210, 215, which have unique frequencies and polarizations for transmission. The photons 205, 210, 215 are sent to a multi-spectral multiplex unit 250. The multiplex unit 250 merges the multi-spectral photons 205, 210, 215 in a sequence for transmission across fiber-optic links, free-space links, or other applicable communication links 295.

The sequence of multi-spectral photons 205, 210, 215 is then propagated into an intensity control device 255. The intensity control device 255 is used to set a range of operation for the disclosed system 200 (i.e. to select a range of the rate of arrival of the photons that are desired to be sensed) and, thus, it operates as an electromagnetic energy filtering device. In one or more embodiments, types of devices that may be employed for the disclosed intensity control device 255 include, but are not limited to, a neutral-density filter and a dark color filter.

The sequence of photons 205, 210, 215 is outputted from the intensity control device 255, and is propagated into a polarization control device 260. The polarization control device 260 is utilized for selecting a polarization of the photons that are desired to be sensed and, as such, it operates as a polarizer. In one or more embodiments, the polarization control device 260 may select various different polarizations including, but not limited to, horizontal polarization, vertical polarization, left-hand circular polarization, and right-hand circular polarization. Types of devices that may be used for the disclosed polarization control device 260 include, but are not limited to, a polarization plate, a Brewster's angle polarizer, and a thin film polarizer. The precise type of polarizer device to be selected for the system 200 depends upon the particular engineering requirements, such as the polarization rejection ratio, the size and weight limitations of the polarizer, and the wavelength range of operation.

From the output of the polarization control device 260, the sequence of photons 205, 210, 215 is propagated onto the collection surface of a focusing element 265. In one or more embodiments, types of devices to be employed for the focusing element 265 include, but are not limited to, a single lens, a double lens, an array of lenses, a Fresnel lens, refractive elements, reflective elements (e.g., concave mirrors), and other related lens systems up to the complexity of a fully engineered telescope. The focusing element 265 is used to focus the photons 205, 210, 215 onto a frequency selective electromagnetic detector 160.

Once the frequency selective electromagnetic detector 160 senses the sequence of photons 205, 210, 215, the frequency selective electromagnetic detector 160 emits a sequence of electrical pulses 235, 240, 245. Each of the electrical pulses 235, 240, 245 has a voltage that is proportional to its respective photon's 205, 210, 215 energy level. The sequence of electrical pulses 235, 240, 245 is then inputted into a processor 270 for processing and de-multiplexing. The processor 270 uses the emitted electrical pulse 235, 240, 245 information to determine each of the photon's 205, 210, 215 associated frequency and/or wavelength. After the electrical pulses 235, 240, 245 are de-multiplexed, the processor 270 sends each of the electrical pulses 235, 240, 245 to a different receiver 275, 280, 290.

For the disclosed system 200, a procedure is necessary to provide for frequency calibration. Typically, this involves using emission spectra from samples (e.g., neon and mercury) that have frequency outputs that are well characterized and traceable to a standard calibration, such as the National Institute of Standards and Technology (NIST) standards. With these outputs propagated through the frequency selective electromagnetic detector 160 and operationally correlated to the known standards, the overall system 200 will be frequency calibrated.

In addition, a procedure is necessary to provide for temporal calibration for the system 200. Generally, this involves using timing pulses at one or more frequencies that have pulse spacing that is well defined. Usually, high precision devices will be tied to absolute standards generated by NIST or some other carefully calibrated sources. With these outputs propagated though the frequency selective electromagnetic detector 160 and operationally correlated to the known standards, the overall system 200 will be temporally calibrated.

FIG. 3 displays a flow chart 300 of the disclosed method for using the disclosed frequency selective communications system for sensing a sequence of multi-wavelength photons, in accordance with at least one embodiment of the present disclosure. It should be noted that, in one or more embodiments of the present disclosure, the steps as shown in the flow chart 300 may be performed in a variety of different orders than as depicted in the figure. In addition, it should be noted that in some embodiments, at least one of the steps as shown in the flow chart 300 may be omitted from the method.

At the start 305 of the disclosed method, photons are multiplexed into a sequence of photons 310. The sequence of photons is then propagated into an intensity control device 315. Then, a range of the rate of arrival of the desired photons is selected 320. The sequence of photons is then propagated into a polarization control device 325. A selection of the polarization of the desired photons 330 is performed. Then, the sequence of photons is propagated onto a focusing element 335. The photons are then focused onto a frequency selective electromagnetic detector 340. After the photons are focused onto the detector, the sequence of photons is detected 345. Once the sequence of photons is detected, a sequence of electrical pulses, which have voltages that are proportional to each of the photon's energy level, are emitted 350. Then, the emitted sequence of electrical pulses is processed 355 in order to determine each of the photon's associated frequency and/or wavelength. After the sequence of electrical pulses is processed, the sequence of electrical pulses is de-multiplexed 360. After the sequence of electrical pulses is de-multiplexed, the method ends 365.

FIG. 4 illustrates a simplified block diagram of a frequency selective communications system 400 that employs a polarization beam splitter 430 in order to achieve additional bandwidth, in accordance with at least one embodiment of the present disclosure. In particular, this system 400 uses a polarization beam splitter 430 for communication of frequencies with multi-polarizations, which allows for increased bandwidth.

In this figure, multi-polarized light 410 is shown to be inputted into an intensity control device 420. The multi-polarized light 410 has, for example, horizontal and vertical polarizations, or it has left-hand circular polarization and right-hand circular polarization. The intensity control device 420 is used to set a range of operation for the disclosed system 400 (i.e. to select a range of the rate of arrival of the photons that are desired to be sensed). As such, it operates as an electromagnetic energy filtering device.

If the multi-polarized light 410 has left-hand circular polarization and right-hand circular polarization, the multi-polarized light 410 is propagated into a wave plate 425. The wave plate 425 is used to convert the circular polarizations into linear polarizations. It should be noted that if the multi-polarized light 410 has horizontal and vertical polarizations, the use of a wave plate 425 is not required by the system 400.

Then, the multi-polarized light 410 is propagated into a polarization beam splitter 430. The polarization beam splitter 430 is constructed to transmit horizontally polarized light 440, and to reflect vertically polarized light 465. In one or more embodiments, the polarization beam splitter 430 is a transparent cube consisting of two triangular prisms.

From the output of the polarization beam splitter 430, the horizontally polarized light 440 is propagated onto the collection surface of focusing element 445, and the vertically polarized light 465 is propagated onto a collection surface of focusing element 470. The focusing elements 445, 470 are used to focus the light 440, 465 onto frequency selective electromagnetic detectors 160.

Once the frequency selective electromagnetic detectors 160 sense the light 440, 465, each of the frequency selective electromagnetic detectors 160 emits electrical pulses that each have a voltage that is proportional to the energy level of the sensed photons. The electrical pulses are then inputted into a processor for processing. The processor then uses the emitted electrical pulse information to determine the photons' associated frequency and/or wavelength.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

I claim:

1. A communications system for sensing a sequence of photons, the system comprising:
    at least one intensity control device that selects a range of a rate of arrival of the photons that are to be sensed;
    at least one polarization control device for selecting a polarization of the photons that are to be sensed;
    at least one focusing element for focusing the photons that are being sensed;
    at least one frequency selective electromagnetic detector, wherein the at least one frequency selective electromagnetic detector detects the sequence of the photons that are focused from the at least one focusing element,
    wherein when the at least one frequency selective electromagnetic detector senses at least one photon, the at least one frequency selective electromagnetic detector emits at least one electrical pulse having a voltage that is proportional to an energy level of the at least one photon; and
    at least one processor for processing the at least one electrical pulse and for de-multiplexing the sequence of the at least one electrical pulse based on the at least one electrical pulse voltage.

2. The communications system for sensing a sequence of photons of claim 1, wherein the communications system is an optical communications system that is used to sense photons having optical frequencies.

3. The communications system for sensing a sequence of photons of claim 1, wherein the at least one intensity control device is an electromagnetic energy filtering device.

4. The communications system for sensing a sequence of photons of claim 1, wherein the at least one polarization control device is a polarizer.

5. The communications system for sensing a sequence of photons of claim 4, wherein the polarizer selects at least one of horizontal polarization, vertical polarization, left-hand circular polarization, and right-hand circular polarization.

6. The communications system for sensing a sequence of photons of claim 1, wherein the at least one focusing element is a signal collection lens.

7. The communications system for sensing a sequence of photons of claim 1, wherein the at least one frequency selective electromagnetic detector includes a nanowire array constructed from a plurality of nanowires of different compositions.

8. The communications system for sensing a sequence of photons of claim 7, wherein at least one nanoparticle-sized diameter thermoelectric junction is formed between the nanowires of different compositions.

9. The communications system for sensing a sequence of photons of claim 7, wherein at least one of the nanowires in the nanowire array is manufactured from a compound material including Bismuth (Bi) and Tellurium (Te).

10. A method consisting of a communications system for sensing a sequence of photons, the method comprising:
propagating the sequence of the photons into an input of at least one intensity control device;
selecting, with the at least one intensity control device, a range of a rate of arrival of the photons that are to be sensed;
propagating the sequence of the photons from an output of the at least one intensity control device into an input of at least one polarization control device;
selecting, with the at least one polarization control device, a polarization of the photons that are to be sensed;
propagating the sequence of the photons from an output of the at least one polarization control device onto a collection surface of at least one focusing element;
focusing, with the at least one focusing element, the photons that are collected onto at least one frequency selective electromagnetic detector;
detecting, with the at least one frequency selective electromagnetic detector, the sequence of the photons that were focused by the at least one focusing element;
emitting, from an output of the at least one frequency selective electromagnetic detector, a sequence of electrical pulses, wherein each of the electrical pulses has a voltage that is proportional to an energy level of its respective detected photon;
processing, with at least one processor, the sequence of the electrical pulses; and
de-multiplexing, with the at least one processor, the sequence of the electrical pulses based on the voltage of the electrical pulses.

11. The method of claim 10, wherein the communications system is an optical communications system that is used to sense photons having optical frequencies.

12. The method of claim 10, wherein the at least one intensity control device is an electromagnetic energy filtering device.

13. The method of claim 10, wherein the at least one polarization control device is a polarizer.

14. The method of claim 13, wherein the polarizer selects at least one of horizontal polarization, vertical polarization, left-hand circular polarization, and right-hand circular polarization.

15. The method of claim 10, wherein the at least one focusing element is a signal collection lens.

16. The method of claim 10, wherein the at least one frequency selective electromagnetic detector includes a nanowire array constructed from a plurality of nanowires of different compositions.

17. The method of claim 16, wherein at least one nanoparticle-sized diameter thermoelectric junction is formed between the nanowires of different compositions.

18. The method of claim 16, wherein at least one of the nanowires in the nanowire array is manufactured from a compound material including Bismuth (Bi) and Tellurium (Te).

19. A communications device for sensing a sequence of photons, the device comprising:
at least one intensity control device that selects a range of a rate of arrival of the photons that are to be sensed;
at least one polarization control device for selecting a polarization of the photons that are to be sensed;
at least one focusing element for focusing the photons that are being sensed;
at least one frequency selective electromagnetic detector, wherein the at least one frequency selective electromagnetic detector detects the sequence of the photons that are focused from the at least one focusing element,
wherein when the at least one frequency selective electromagnetic detector senses at least one photon, the at least one frequency selective electromagnetic detector emits at least one electrical pulse having a voltage that is proportional to an energy level of the at least one photon; and
at least one processor for processing the at least one electrical pulse and for de-multiplexing the sequence of the at least one electrical pulse based on the at least one electrical pulse voltage.

20. A computer-readable medium comprising instructions that when executed are used to process, with at least one processor, a sequence of electrical pulses, the method comprising:
providing the sequence of the electrical pulses to the at least one processor;
processing, with the at least one processor, the sequence of the electrical pulses,
wherein the at least one processor uses voltages of the electrical pulses to calculate frequencies and wavelengths of photons that are associated with the electrical pulses; and
de-multiplexing, with the at least one processor, the sequence of the electrical pulses.

* * * * *